March 25, 1952
W. GUIER ET AL
2,590,172
HOISTING APPARATUS
Filed Oct. 8, 1945
3 Sheets-Sheet 2
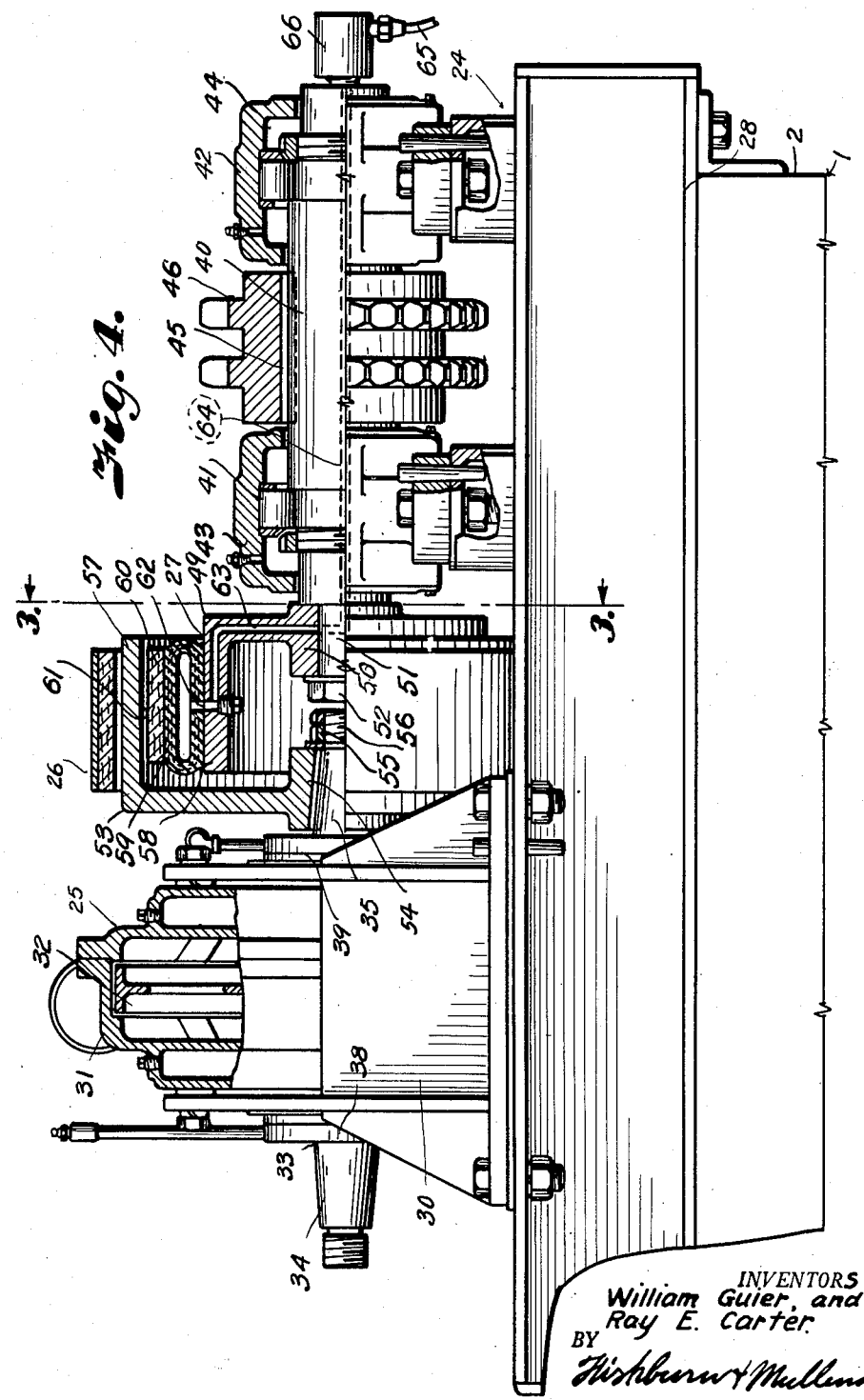
INVENTORS
William Guier, and
Ray E. Carter.
BY
ATTORNEYS.

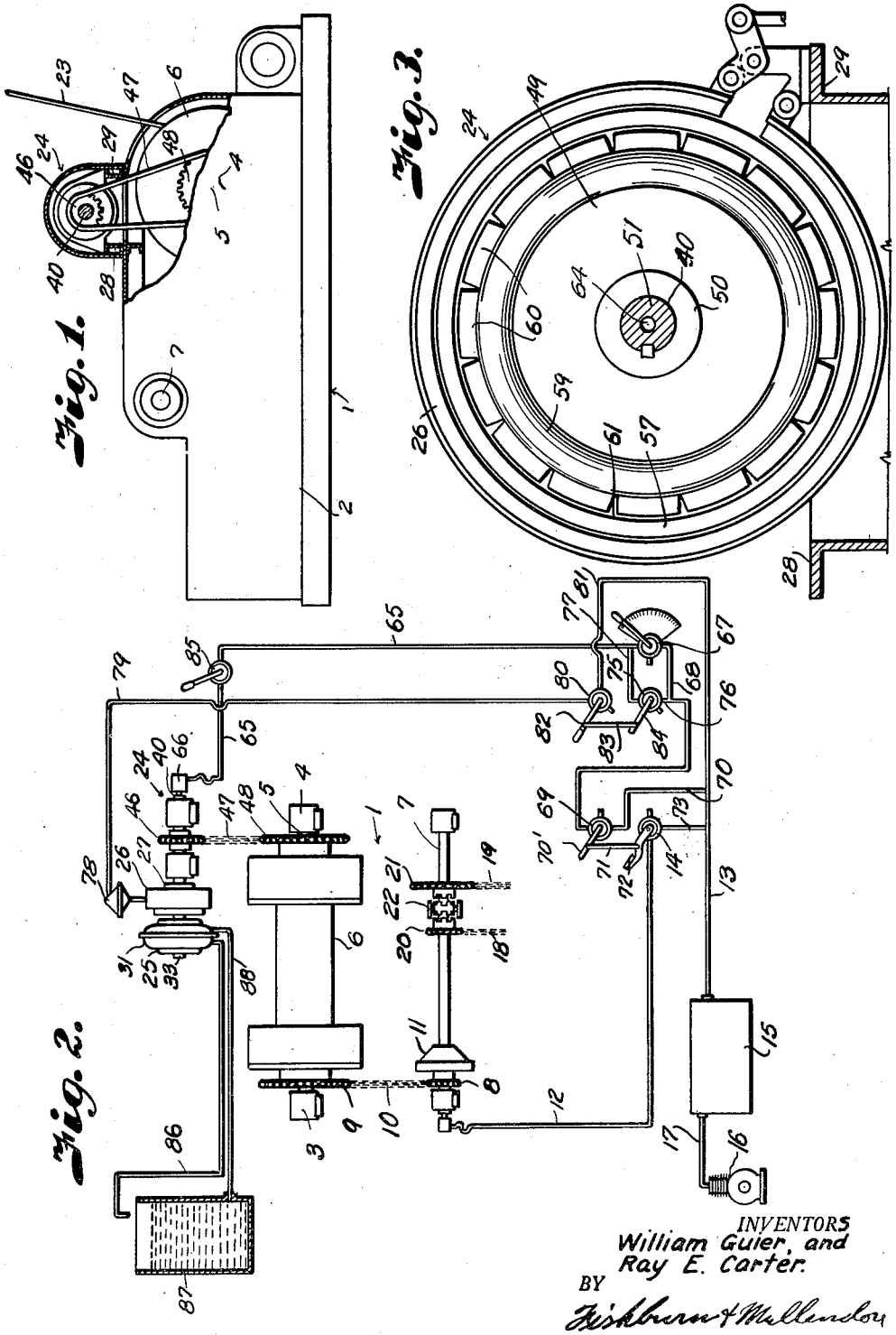

March 25, 1952 — W. GUIER ET AL — 2,590,172
HOISTING APPARATUS

Filed Oct. 8, 1945 — 3 Sheets-Sheet 3

INVENTORS
William Guier, and
Ray E. Carter.
BY Fishburn + Mullendore
ATTORNEYS.

Patented Mar. 25, 1952

2,590,172

UNITED STATES PATENT OFFICE 2,590,172

HOISTING APPARATUS

William Guier and Ray E. Carter, Tulsa, Okla., assignors to Unit Rig & Equipment Company, Tulsa, Okla., a partnership composed of Jerry Underwood, Hugh Chancey, William E. Guier, and Ray E. Carter Application October 8, 1945, Serial No. 620,886

8 Claims. (Cl. 254—187)

This invention relates to hoisting apparatus used in handling heavy loads at high speeds such as the drawworks of a drilling rig which includes a winding drum for controlling the feed of the drilling string during drilling operations and for running the drilling string into and out of the hole being drilled.

The principal object of the present invention is to provide a hoisting apparatus of this character with a hydrodynamic brake or retarder mechanism in direct connection with the winding drum for controlling rotational speed of the drum, thereby effecting a better and more efficient control than with the usual braking mechanisms of such apparatus.

Other objects of the invention are to provide the hydrodynamic brake unit with a clutch mechanism for disengaging the hydrodynamic brake when the braking force is not needed; to provide a friction brake arranged to act in cooperation with the clutch for supplementing the effectiveness of the hydrodynamic brake as when supporting load of the drill pipe on the winding drum; to provide a clutch arrangement through which the braking effect on the drum may be regulated to any desired degree; and to provide a system of controls for regulating action of the clutch and friction brake mechanisms.

In accomplishing these and other objects of the invention, we have provided improved structure, the preferred forms of which are illustrated in the accompanying drawings wherein:

Fig. 1 is a side elevational view, partly in section, of a drawworks equipped with a control unit embodying the features of the present invention.

Fig. 2 is a diagrammatic view of the winding drum, the winding drum drive shaft, the control unit for the winding drum, the operating valves, and piping system for the unit.

Fig. 3 is a cross section through the control unit on the line 3—3 of Fig. 4.

Fig. 4 is an enlarged side elevational view of the control unit, a part being shown in section to better illustrate the construction thereof.

Figure 5:
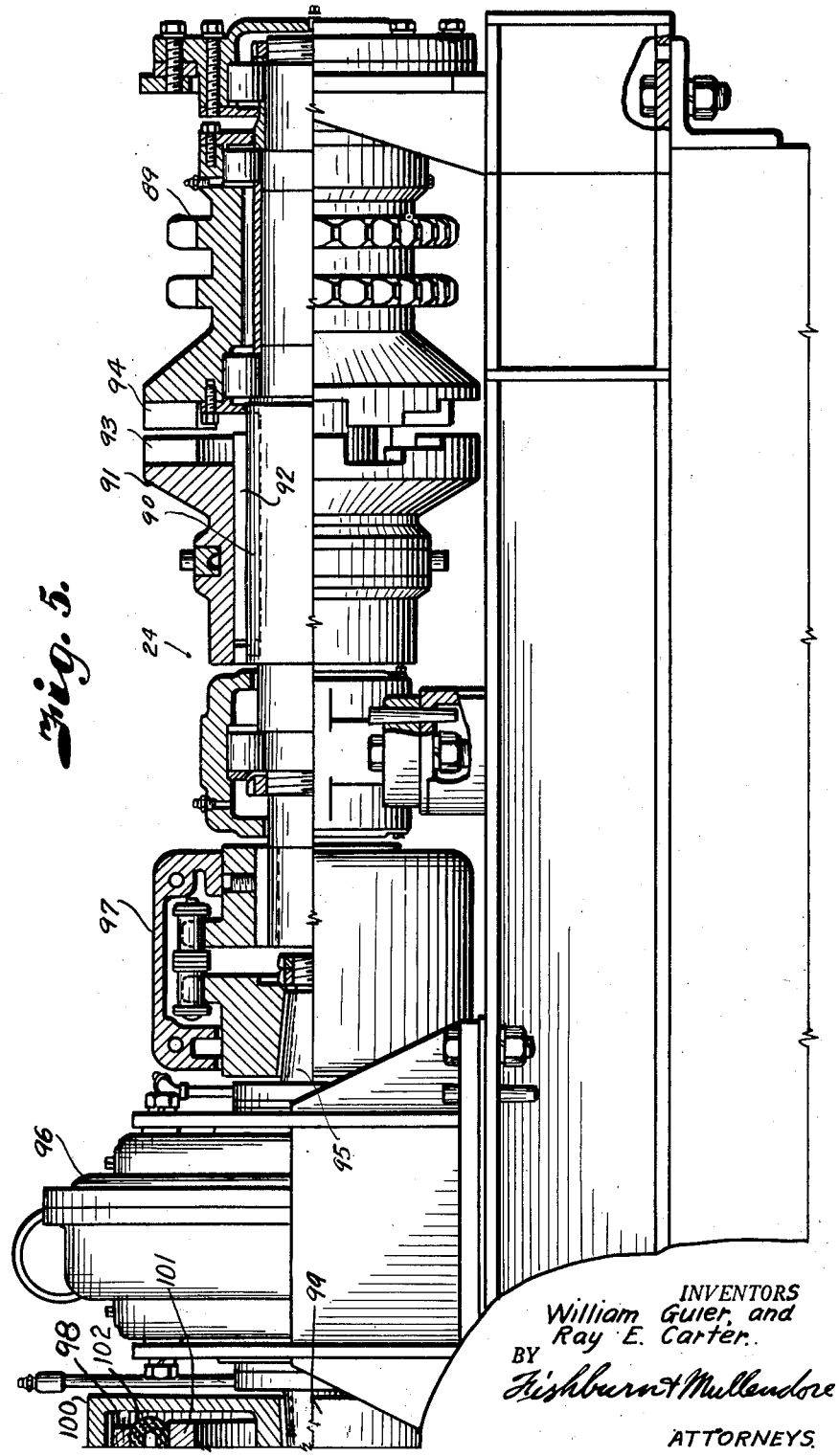
Fig. 5 is a similar view of a modified form of control unit.

Referring more in detail to the drawings:

1 designates a hoisting apparatus such as a drawworks used in drilling rigs for running in and out of the drilling string and for controlling the feed of the drill bit during drilling operations.

The hoisting apparatus includes a frame 2 having bearings 3 and 4 supported by sides thereof to mount a drum shaft 5. Rotatably mounted on the shaft is a winding drum 6 that is driven from a countershaft 7 also carried in bearings at the sides of the frame 2. The shaft 7 has a sprocket 8 connected with a sprocket 9 on the drum by a chain 10. The sprocket 8 is operably connected with the shaft 7 through a clutch 11 of any suitable design, but is preferably a pneumatic clutch adapted to be controlled by a pressure fluid such as compressed air admitted to the clutch through a pipe 12 connected with a header pipe 13, the air being controlled by a valve 14 in the pipe 12. The header pipe 13 connects with a source of compressed air supply such as an air reserve tank 15, the supply being established by a compressor unit 16 connected therewith through a pipe 17.

The shaft 7 is operated in forward or reverse directions from a power unit (not shown), the driving connection being effected through one or the other of chains 18 or 19 operating over different sized sprockets 20 and 21 on the shaft 7 and which are adapted to be selectively connected therewith by a clutch 22 of any suitable design.

Wound on the drum 6 is a drilling cable 23 that extends upwardly over one of the crown pulleys of a derrick (not shown) and connects with the swivel head of a drilling string (also not shown) through a tackle block as in conventional practice.

In all rigs, the hoisting drum is under control of a manually operated friction brake adapted to operate on the drum or the driving shaft thereof so as to support the drilling string in suspension or to feed off the drilling string as the drill bit makes hole. However, with such brake mechanisms, it has been impossible to maintain efficient and positive control of the winding drum so as to stop the load at any desired point, and to maintain the desired feed of the drilling string. Such brakes must also be extremely large to operate satisfactorily when running the drill pipe into the borehole and the braking surfaces must be cooled with a circulating fluid otherwise the brakes cannot safely control such large loads at high speeds. Another difficulty is that such brakes do not allow the accurate control of the drum which is necessary in maintaining a desired feed of the drilling string during drilling operation. It is, therefore, the purpose of the present invention, to substitute a relatively small control unit 24 that is directly connected with the winding drum 6 and which includes a hydrodynamic brake or retarder 25, a relatively small mechanical friction brake 26 in association with a smooth acting clutch 27 to control with accuracy the effectiveness of the braking mechanisms. The unit is mounted directly over the drum on channels 28 and 29 that extend transversely of the frame 2.

The hydrodynamic brake 25 includes a frame 30 supported on the transverse channels 28 and 29 which carries a housing-like stator 31 containing a liquid and in which a rotor 32 operates to effect friction between the fluid and the interior surfaces of the rotor whereby energy of rotation is dissipated. The rotor 32 is fixed to a shaft 33 having ends 34 and 35 projecting laterally through bearings 38 and 39 in the frame 30. The unit also includes driving shaft 40 that is mounted in roller bearings 41 and 42 carried within spaced brackets 43 and 44 mounted on the channels 28 and 29 in alignment with the rotational axis of the rotor 32. Fixed on the shaft 40 intermediate the bearings by means of a spline 45 is a sprocket 46, which sprocket is connected by a driving chain 47 with a sprocket 48 directly connected with the winding drum 6 at the end thereof opposite the sprocket 9.

The clutch 27 connects the shafts 33 and 40 and includes a drum member 49 having a hub 50 fixed to a reduced terminal 51 of the shaft 40 by jam nut 52. Cooperating with the driving member 49 is a complementary drum member 53 having a hub 54 keyed to the projecting end 35 of the shaft 33 and secured by jam nuts 55 that are mounted on a reduced threaded terminal 56 of the hydrodynamic brake shaft as shown in Fig. 4. The clutch member 53 has a circumferential flange-like portion 57 spaced from and cooperating with a similar oppositely disposed flange 58 of the member 49 to enclose a clutching element 59 therebetween.

The clutch element 59 comprises an annular expandable tube of tire-like formation encircling the flange 58 and which is attached thereto for rotation therewith. The outer circumference of the tube carries friction blocks 60 adapted to frictionally engage the inner annular surface 61 of the flange 57 upon introduction of inflating medium into the tube. The inflating medium, for example, compressed air, is admitted into the interior of the tube through a port 62 having connection with a channel 63 formed within the member 49 of the clutch and which connects with an axial channel 64 of the shaft 40. The channel 64 at the outer end of the shaft 40 connects with an air supply pipe 65 by a standard rotary sealing gland contained within a housing 66. The pipe 65 connects with the supply pipe 13 previously mentioned through a finely adjustable control valve 67 which is connected by a pipe 68 with a valve 69 supplied from the pipe 13 through a branch pipe 70 as shown in Fig. 2.

The actuating lever 70' of the valve 69 is connected through a link 71 with a foot lever 72 of the control valve 14. The valve 14 is also connected with the pipe 13 through a branch pipe 73 and supplies air through the pipe 12 to actuate the drive shaft clutch 11 previously referred to. The valves 69 and 14 are coupled so that when one valve is closed the other valve is open. The valve 67 is also connected in bypass relation with a valve 75 connected with the pipe 68 and with the pipe 65 on the discharge side of the valve 67 by branch pipes 76 and 77.

The brake 26 is actuated by a pressure actuated diaphragm indicated by the housing 78 that is supplied with air through a pipe 79 connected with a control valve 80 having the inlet side thereof connected to the pipe 13 by a branch pipe 81. The valve 80 has an operating lever 82 connected through a link 83 with the operating lever 84 of the valve 75 so that when the valve 80 is open the valve 75 is closed. If desired, the air supply to the clutch may be shut off by a manually operated valve 85 located in the pipe 65.

In order to dissipate the heat of friction of the liquid in the hydrodynamic brake, the liquid is circulated through a pipe 86 to a source of supply contained in the tank 87 and to return to the hydrodynamic brake through a pipe 88.

Assuming that the apparatus is constructed and assembled as described in a drilling rig and that drilling is in progress, the valves 14 and 75 are closed and the valves 69 and 80 are opened. Thus, the air is shut off to the drum clutch 11 so that the winding drum is under the entire control of the control unit 24, however, air flows through the pipe 70, open valve 69, pipe 68, through the finely adjusted regulating valve 67, through the pipe 65, valve 85, channel 64, channel 63, and port 62 to inflate the tube element 59 so that the friction blocks carried thereby are pressed into contact with the flanges 57 of the clutch member 53. Simultaneously, air flows through the pipe 81, valve 80, and pipe 79 to the pressure actuator 78 for tightening the brake band 26 about the flange 57 of the clutch member 53.

The winding drum 6 is, therefore, locked by the control unit from rotation, and the drilling string is under complete control and may be lowered in conformity with the progress of the bit. This is effected by actuating the valve 67 so as to bleed off pressure from the expandable tube 59 of the air clutch, allowing the friction blocks to move slightly out of seizing relation with the flange of the clutch member 53 so as to permit rotation of the control shaft 40, sprocket 46, chain 47, and the winding drum 6. By properly actuating the finely adjusted valve, the clutch may be made to creep to such an extent that the movement of the winding drum is in conformity with best drilling practices.

Attention is directed to the fact that when the pressure actuator 78 for the brake 26 is actuated, the hydrodynamic brake acts to supplement the braking action so that the winding drum is brought quickly under control when air is admitted to the pressure actuator. It is also obvious that action of the hydrodynamic brake in conjunction with the mechanical brake permits the use of a relatively small brake and eliminates possibility of burning out of the brake lining ordinarily produced by rapid application of the braking force at high speeds.

In hoisting, as when running in or out of the drill pipe from the hole, the driller presses the foot lever 72 to open simultaneously the valve 14 and close the valve 69. This shuts off air to the pneumatic clutch and supplies air to the actuator of the clutch 11. The valve 80 is closed and the valve 75 is opened by actuation of the hand lever 82. The shaft 7 is now rotating to actuate the winding drum. The air having been released from the pneumatic clutch 24 of the control unit, frees the drum so that the power applied to the shaft 7 is transmtited to the winding drum without resistance of the control unit.

In running the drill pipe into the borehole, the foot lever 72 is released to close the valve 14 and open the valve 69 which permits air to flow through the pipe 70, valve 69, pipe 68, pipe 76, valve 75, pipe 65, valve 85 to inflate the expandable tube 59, the air having bypassed the valve 67. Inflation of the tube forces the friction blocks 60 into seizing contact with the flange 57 of the clutch member 53 to connect the hydrodynamic brake so that it acts to control rotation of the winding drum.

The form of the invention shown in Fig. 5 is substantially the same as that shown in Fig. 4 with the exception that the sprocket 89 which is equivalent to the sprocket 46 previously described is connected with the control shaft 90 by a jaw clutch 91 slidably fixed to the shaft by a key 92 and having lugs 93 adapted to engage with lugs 94 on the sprocket 89. The control shaft 90 is connected with the shaft 95 of the hydrodynamic brake 96 by a flexible coupling 97 of any suitable design. In this instance, the pneumatic clutch 98 and brake 99 are located at the opposide side of the hydrodynamic brake and the brake drum element 100 of the clutch connects with a projecting end 99. The other member 101 of the clutch is stationary and is adapted to be seized by the expandable element 102 of the clutch. The clutch thus provides a pneumatic brake, and the hydrodynamic brake is supplemented in any desired amount by controlled admission of air to the expandable element 102 of the clutch.

From the foregoing it is obvious that we have provided an improved and extremely accurate control unit for the winding drum of a drawworks or similar hoisting apparatus and that the control is applied directly to the drum of the hoist.

What we claim and desire to secure by Letters Patent is:

1. A control unit of the character described including, a driving member, a clutch member on the driving member, a complementary clutch member, means for mounting the complementary clutch member in coaxial alignment with the clutch member on the driving member, pneumatic means for frictionally interconnecting the clutch members, a mechanical brake for action on the complementary clutch member, pneumatic means for actuating the brake, means for supplying air under pressure to the mechanical brake actuating means, a valve in said air supply means for the brake actuating means, means for supplying air under pressure to said pneumatic clutch means, a valve in the last-named supply adapted for a fine control of said clutch connecting means, a bypass for the last-named valve, a valve in the bypass, and means interconnecting the bypass valve with the first-named valve for effecting simultaneous opening of one of the said interconnected valves and the closing of the other of said interconnected valves.

2. In combination, a clutch including, a pair of complementary members, pneumatic means for frictionally interconnecting the clutch members, a brake acting on one of the clutch members, a pneumatic actuator for the brake, means for supplying air under pressure to the actuator, means for supplying air under pressure to said pneumatic means, a valve in the air supply to the brake actuator, a valve in the other supply adapted for a fine control of said pneumatic means, a bypass for the last-named valve, a valve in the bypass and operating means interconnecting the valve in the bypass with the valve in the air supply to the brake actuator.

3. In combination, a clutch including, a pair of complementary members, pneumatic means for frictionally interconnecting the clutch members, a brake acting on one of the clutch members, a pneumatic actuator for the brake, means for supplying air under pressure to the actuator, means for supplying air under pressure to said pneumatic means, a valve in the air supply to the brake actuator, a valve in the other supply adapted for a fine control of said pneumatic means, a bypass for the last-named valve, a valve in the bypass, and means interconnecting the valve in the bypass with the first-named valve for alternate opening and closing of said valves.

4. In combination with the winding drum of a drawworks, a control unit, a driving connection between the winding drum and the control unit, a clutch including a member having positive driving engagement with the driving connection and a complementary member, means mounting the complementary member for rotation coaxially with the other clutch member, a brake having frictional engagement with the complementary clutch member, pressure expandable means between the clutch members, means for supplying a pressure medium to the pressure expandable means for connecting the clutch members for rotation by the winding drum, an actuator for the brake, means in said pressure medium supply for controlling air pressure in the expandable means, means connecting the control means with the brake actuating means, and a valve in bypassing relation with the control means having a finer adjustment of control than said control means.

5. In combination with the winding drum of a drawworks, a control unit, a driving connection between the winding drum and the control unit, a clutch provided with a member having positive driving engagement with the driving connection and a complementary member, hydrodynamic retarding means connected with the complementary member for controlling rotation of the winding drum through said driving connection, a brake having frictional engagement with the complementary clutch member, pressure expandable means between the clutch members to effect interconnection of said members, duct means for supplying a pressure medium to the expandable means for connecting the clutch members for rotation of the hydrodynamic retarding means by the winding drum, a valve in said duct means, an actuating mechanism for the brake, a valve having a finer degree of adjustment in bypassing relation with said valve, and means connecting the first-named valve with the brake actuating mechanism for simultaneous operation.

6. In combination with a winding drum of a drawworks, a control unit, a driving connection between the winding drum and the control unit for driving the control unit at a speed different than the speed of the winding drum, a clutch provided with a member having positive driving engagement with the driving connection and a complementary member, a hydrodynamic retarder directly connected with the complementary member of the clutch, a brake having frictional engagement with said complementary member of the clutch, pressure expandable means between the clutch members, means for supplying a pressure medium to the pressure expandable means for connecting the clutch members for rotation by the winding drum to actuate the hydrodynamic retarder, an actuator for the brake, means in said pressure medium supply for controlling air pressure in the expandable means, means connecting the control means with the brake actuating means, and a valve in bypassing relation with the control means having a finer adjustment of control than said control means.

7. In combination with the winding drum of a drawworks, an actuator for the drawworks, a control unit, a driving connection between the winding drum and the control unit separate from the actuator for driving the control unit at a different speed than the rotational speed of the winding drum, said control unit including a clutch provided with a member having positive driving engagement with the driving connection and a complementary member, means mounting the complementary member of the clutch for rotation coaxially with the other clutch member, a brake having frictional engagement with the complementary clutch member, expandable means between the clutch members, means for supplying a pressure medium to the expandable means for connecting the clutch members for rotation by the winding drum, and an actuator for the brake.

8. In combination with the winding drum of a drawworks, an actuator for the drawworks, a control unit, a driving connection between the winding drum and the control unit separate from the actuator for driving the control unit at a different speed than the rotational speed of the winding drum, said control unit including a clutch provided with a member having positive driving engagement with the driving connection and a complementary member, means mounting the complementary member of the clutch for rotation coaxially with the other clutch member, a brake having frictional engagement with the complementary clutch member, expandable means between the clutch members, means for supplying a pressure medium to the expandable means for connecting the clutch members for rotation by the winding drum, an actuator for the brake, a hydrodynamic retarder, and means for connecting the hydrodynamic retarder with said complementary member of said clutch.

WILLIAM GUIER.
RAY E. CARTER.

REFERENCES CITED

The following references are of record in the file of this patent:

UNITED STATES PATENTS

| Number | Name | Date |
|---|---|---|
| 1,231,628 | Lehr | July 3, 1917 |
| 1,566,111 | Miller | Dec. 15, 1925 |
| 1,661,295 | Linderman | Mar. 6, 1928 |
| 1,864,126 | Ferris | June 21, 1932 |
| 1,985,889 | De La Mater et al. | Jan. 1, 1935 |
| 1,992,912 | De La Mater | Feb. 26, 1935 |
| 2,044,999 | Smith et al. | June 23, 1936 |
| 2,279,597 | Selmer | Apr. 14, 1942 |
| 2,324,000 | Johnston | July 13, 1943 |
| 2,339,450 | Ashton | Jan. 18, 1944 |
| 2,349,494 | Fawick | May 23, 1944 |

FOREIGN PATENTS

| Number | Country | Date |
|---|---|---|
| 101,118 | Austria | Apr. 15, 1925 |